United States Patent [19]

Byers et al.

[11] Patent Number: 4,776,539
[45] Date of Patent: Oct. 11, 1988

[54] CRADLE APPARATUS FOR SUPPORTING PAYLOADS IN A SPACE VEHICLE

[75] Inventors: Frank L. Byers; James R. McCandless, both of Littleton; George W. Salt, Highlands Ranch, all of Colo.

[73] Assignee: Orbital Research Partners, L.P., Fairfax, Va.

[21] Appl. No.: 786,212

[22] Filed: Oct. 10, 1985

[51] Int. Cl.[4] .............................................. B64G 1/22
[52] U.S. Cl. .................................. 244/158 R; 410/49
[58] Field of Search ................ 244/158 R, 161, 118.1; 410/2, 47, 49; 248/315, 316.1; 211/60.1; 89/1.802, 1.803, 1.804, 1.805, 1.801

[56] References Cited

U.S. PATENT DOCUMENTS

| | | | |
|---|---|---|---|
| 2,670,166 | 2/1954 | Applegate | 410/49 |
| 2,968,410 | 1/1961 | Hamilton et al. | 89/1.805 |
| 3,160,289 | 12/1964 | Leefer | 89/1.805 |
| 3,194,525 | 7/1965 | Webb | 410/49 |
| 4,082,240 | 4/1978 | Heathman et al. | 244/158 R |
| 4,508,296 | 4/1985 | Clark | 244/158 R |

OTHER PUBLICATIONS

Boeing, "Inertial Upper Stage".

Primary Examiner—Jeffrey V. Nase
Assistant Examiner—Rodney Corl
Attorney, Agent, or Firm—Kirkland & Ellis

[57] ABSTRACT

A lightweight cradle apparatus for supporting payloads such as an upper stage and a mated spacecraft in the cargo bay of a reusable space vehicle like the orbiter used in the NASA Space Transportation System. The cradle apparatus provides support for the payload during launch, abort, and landing of the orbiter and deployment of the payload. The cradle apparatus comprises a forward cradle and an aft cradle that are connected by longitudinal support members. The forward cradle comprises two radial sections joined by a hinge and by a latch, the aft cradle consists of an aft cradle disc and an aft cradle adapter assembly, each longitudinal support member consists of two longitudinal links. The links are joined together at the forward end where they connect to the forward cradle and the links are separated at the aft end by a spacer and connect to the aft cradle. The cradle apparatus transfers loads to the orbiter by means of a keel pin and trunnion connections. The payload is deployed in space by opening the cargo bay doors, unlatching the latch on the forward cradle, rotating the upper section of the forward cradle about the hinge, and rotating the aft cradle and the payload to the launch position for the payload.

10 Claims, 2 Drawing Sheets

CRADLE APPARATUS FOR SUPPORTING PAYLOADS IN A SPACE VEHICLE

BACKGROUND OF THE INVENTION

1. Field of the Invention

This invention relates to the general field of securing a payload in and deploying a payload from the cargo bay of a space vehicle. The payload must be secured to withstand stresses generated by launch, abort, deployment, recovery and landing. In addition, the payload must be easily deployed from the cargo bay once the vehicle is in space. The invention particularly relates to a reusable space vehicle like the orbiter in the NASA Space Transportation System (STS). In the preferred embodiment, the subject invention can be used to secure in and deploy from the orbiter a payload consisting of an upper stage and a mated spacecraft, such as a communications satellite.

2. Brief Description of the Prior Art

The prior art discloses several different designs for cradle structures to be used to support payloads in space. U.S. Pat. No. 4,324,374 issued to Wittman discloses a single, U-shaped cradle with three points of attachment between the payload and the cradle. The payload is positioned in the cradle so that the center of mass of the payload lies in the same plane as the three points of attachment. To deploy the payload, locks located at two of the three points of attachment are released. The connection at the third and final point of attachment is then released by an explosive separation, thereby allowing a single spring to impart translation and rotation to the payload.

While the use of a single cradle does provide support in the lateral and longitudinal (X and Y) directions as well as in the gravity (or Z) direction, this system has a disadvantage in that a single cradle is best suited for payloads which are small in size and light in weight. A larger payload would be more efficiently supported by use of both forward and aft connections between the payload and the cradle. Moreover, the support provided by the single cradle is limited to attachments at three points. As a result, the load at each point of attachment is greater than if additional attachment points were used.

A single, continuous retention cradle to support a payload during launch or retrieval missions is disclosed in an article by Ceppollina and Mansfield (Astronautics and Aeronautics, February 1975, pp. 48–56). That cradle consists of three sections which are hinged together. Each of the three sections, two upper hinged sections and a fixed bottom section, has a V-groove connection which mates with a corresponding ring around the circumference of the payload. A separate positioning structure, which also is located in the cargo bay, is used to move the payload from the retention cradle to a deployment position. The payload is supported by a continuous support system.

However, like the device disclosed in Wittman, the retention cradle disclosed by Ceppollina has certain disadvantages. First, the retention cradle has only a single ring and thus may not be suited for supporting larger payloads. Second, the use of a continuous V-groove connection requires that the payload be equipped with a corresponding ring, which adds weight to the payload to be launched and deployed in space. Finally, the deployment mechanism for the Ceppollina retention cradle is separate from and not integrated into the cradle, thereby adding weight and consuming additional space in the cargo bay of an orbiter.

U.S. Pat. No. 4,044,974 issued to Lingley discloses a single-hinged cradle structure with forward and aft connection rings to support a payload in the cargo bay of a space vehicle. Both the forward and aft connection rings, referred to as continuous integrated normal clamping hoop (CINCH) rings, are attached to a single box frame structure. Those rings completely surround a portion of the payload and mate with corresponding connection rings attached to the payload. The payload is deployed after the upper half of the hinged cradle and the attached payload are rotated into the open position.

While the Lingley device has the advantage that the cradle provides continuous forward and aft support for the payload, the device has at least four significant limitations. First, the continuous rings that are attached to the payload and the box frame structure may deform when subjected to the extremes of heat and cold in space prior to deployment. Thus, if a deployment has to be aborted, any differential deformation between the payload and the cradle may prevent the cradle from closing around the payload.

Second, the ring structure described by Lingley is suitable only for a payload which has a regular annular surface which conforms to the annular shape of the cradle. Restricting the shape of the payload to an annular shape limits design flexibility because specific payloads having an irregular shape may be desirable in some instances. The alternative of adding an annular ring around a non-annular payload adds undesirable weight and bulk to the payload.

Third, the Lingley cradle comprises a single box frame structure which supports both the forward and aft connection rings. The box frame structure creates extra weight and takes up space in the cargo bay of he orbiter.

Fourth, forward and aft interface rings must be attached to the spacecraft, thereby increasing the weight and volume of the spacecraft.

Another cradle design, which was developed by Boeing Aircraft Corp. for the Inertial Upper Stage (IUS) system, comprises a forward cradle and an aft cradle. The payload is attached to the forward U-shaped cradle by means of payload retention latch assemblies (PRLAs). The payload is attached to the aft cradle by means of a continuous connection between the aft end of the payload and the aft cradle. The aft cradle tilts and permits the payload to be deployed.

There is no direct structural connection between the forward and aft cradles. Certain longitudinal loads are transferred from the forward and aft cradles through the frame of the payload. Other longitudinal and lateral loads are transferred from the forward cradle to the frame of the orbiter by means of load levelers and a low response damper.

The IUS cradle has certain limitations. First, the forward cradle relies on point attachments to the payload provided by the PRLAs. Use of these point attachments may result in significant differential loading on the forward cradle during launch and requires that the forward cradle be reinforced to withstand the relatively large moments produced by movements of the payload. Second, the aft cradle consists of a frame structure which takes up additional space in the cargo bay of an orbiter. Third, the aft cradle is attached to an orbiter by an assembly which includes a slip ring, a low response spreader beam and a spring and damper assembly. This assembly adds weight and complexity to the aft cradle.

Accordingly, it is an object of the present invention to provide a lightweight support system for securing a heavy payload in the cargo bay of a reusable space vehicle during all phases of operation.

Another object of this invention is to provide a reliable support system which provides for the easy deployment of the payload from the cargo bay.

A further object of this invention is to provide a flexible support system which is capable of securing a payload which has an irregular shape.

Yet another object of this invention is to provide a support system which has the capability to easily deploy a payload in space and to secure a payload which has been prepared for deployment in space but has had the deployment aborted.

SUMMARY OF THE INVENTION

The present invention provides a new and improved lightweight cradle apparatus for supporting payloads such as an upper stage and a mated spacecraft in the cargo bay of a reusable launch vehicle. The preferred embodiment of the invention is adapted for use in the cargo bay of the orbiter used in the NASA Space Transportation System (STS).

The cradle apparatus is used to support a payload within the orbiter and to permit deployment of the payload after the orbiter is in space. The cradle apparatus comprises a forward cradle and an aft cradle that are connected by longitudinal support members. The forward cradle comprises two circumferential sections joined by a hinge on one side and by a latch on the other. The forward cradle completely surrounds the payload and supports the payload by means of a plurality of pad assemblies which bear on the outer surface of the payload, thus reducing the maximum moment produced by movements of the payload. Lateral loads are transferred to the frame of the orbiter by means of keel pins and trunnion connections. Lateral loads along the Y axis are transferred to the orbiter by a keel pin located on the Z axis of the forward cradle. The keel pin engages the active keel fitting of the orbiter. Lateral loads along the Z axis are transferred to the orbiter by cradle trunnions located on the cradle Y axis. A portion of the longitudinal or X axis loads on the forward cradle are transferred to the orbiter by the keel pin. The load degrees of freedom total four.

The aft cradle comprises an aft cradle disc and an aft cradle adapter assembly. Both lateral and longitudinal loads are transferred by the aft cradle to the frame of the orbiter. The aft cradle trunnions transfer both X axis longitudinal loads and Z axis lateral loads to the orbiter. Lateral loads along the Y axis are transferred by an internal structure in the aft cradle through longitudinal support members and then to fixed supports on the orbiter through the cradle trunnions. The load degrees of freedom then total eight.

The use of longitudinal support elements permits a reduction in the weight of the forward and aft cradles. The use of trunnions permits the aft cradle to be rotated, thus allowing the upper stage with its mated satellite to be elevated for deployment.

DESCRIPTION OF THE PREFERRED EMBODIMENT

The preferred embodiment of the cradle apparatus is set forth herein, for illustrative purposes, in connection with the orbiter of the NASA Space Transportation System (STS) and a Transfer Orbit Stage TM (TOS ®) upper stage developed by Orbital Sciences Corporation.

Figure 1:
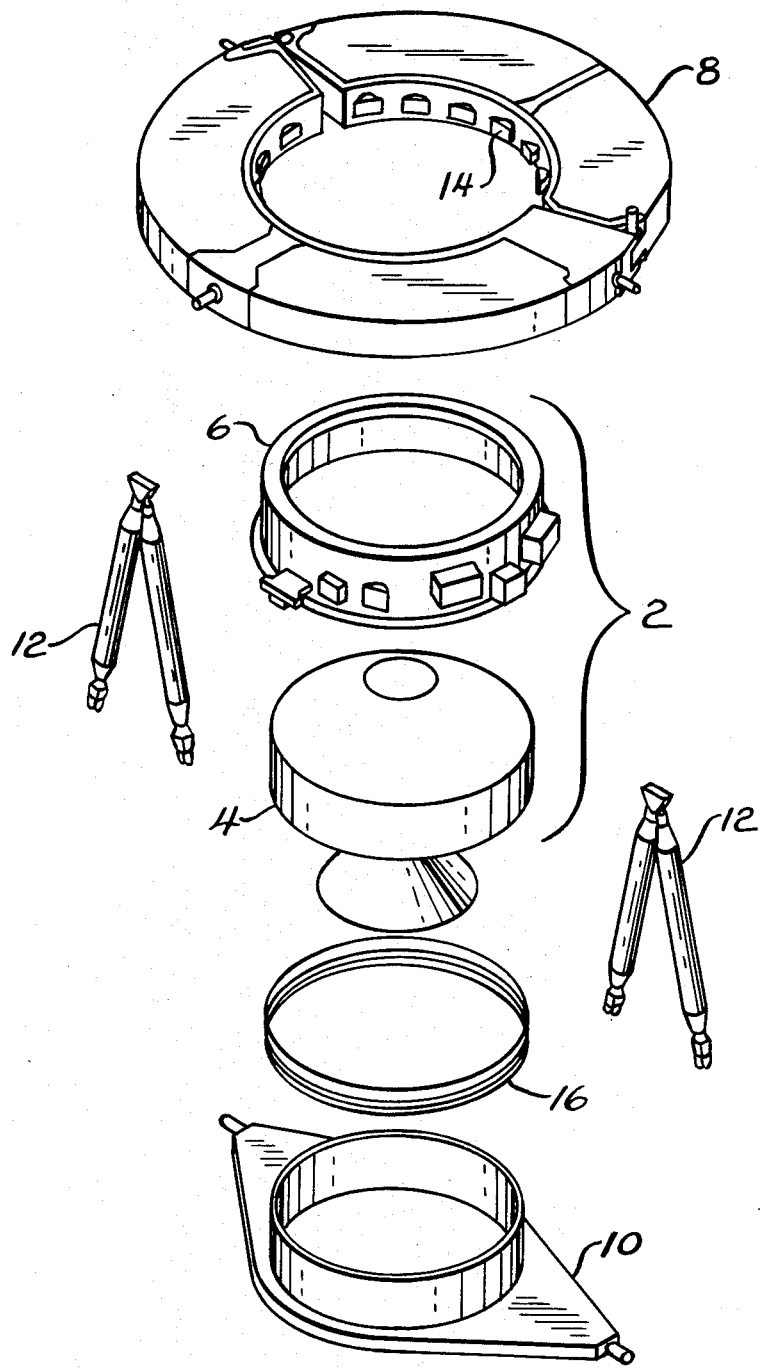
FIG. 1 is a perspective view of the major components of the forward cradle, the aft cradle, the longitudinal support members and the upper stage.

The major components of the cradle apparatus are illustrated in FIG. 1. The upper stage 2 comprises a solid rocket motor 4 and a forward skirt 6. The upper stage 2 is supported by a forward cradle 8 and an aft cradle 10 that are connected together by a pair of longitudinal support members 12. The forward cradle 8 supports the upper stage 2 by the use of sixteen individual pads 14 which are arranged around the inner circumference of the forward cradle 8. The pads 14 are the subject of a copending application, "Pad Apparatus for Supporting A Payload in a Cradle Apparatus of a Space Vehicle," filed Oct. 10, 1985, Ser. No. 786,209, by Frank L. Byers, and assigned to the assignee of the present invention. The aft cradle 10 supports the upper stage 2 by the use of a separation joint 16 known as a "super zip" connection.

Figure 2:
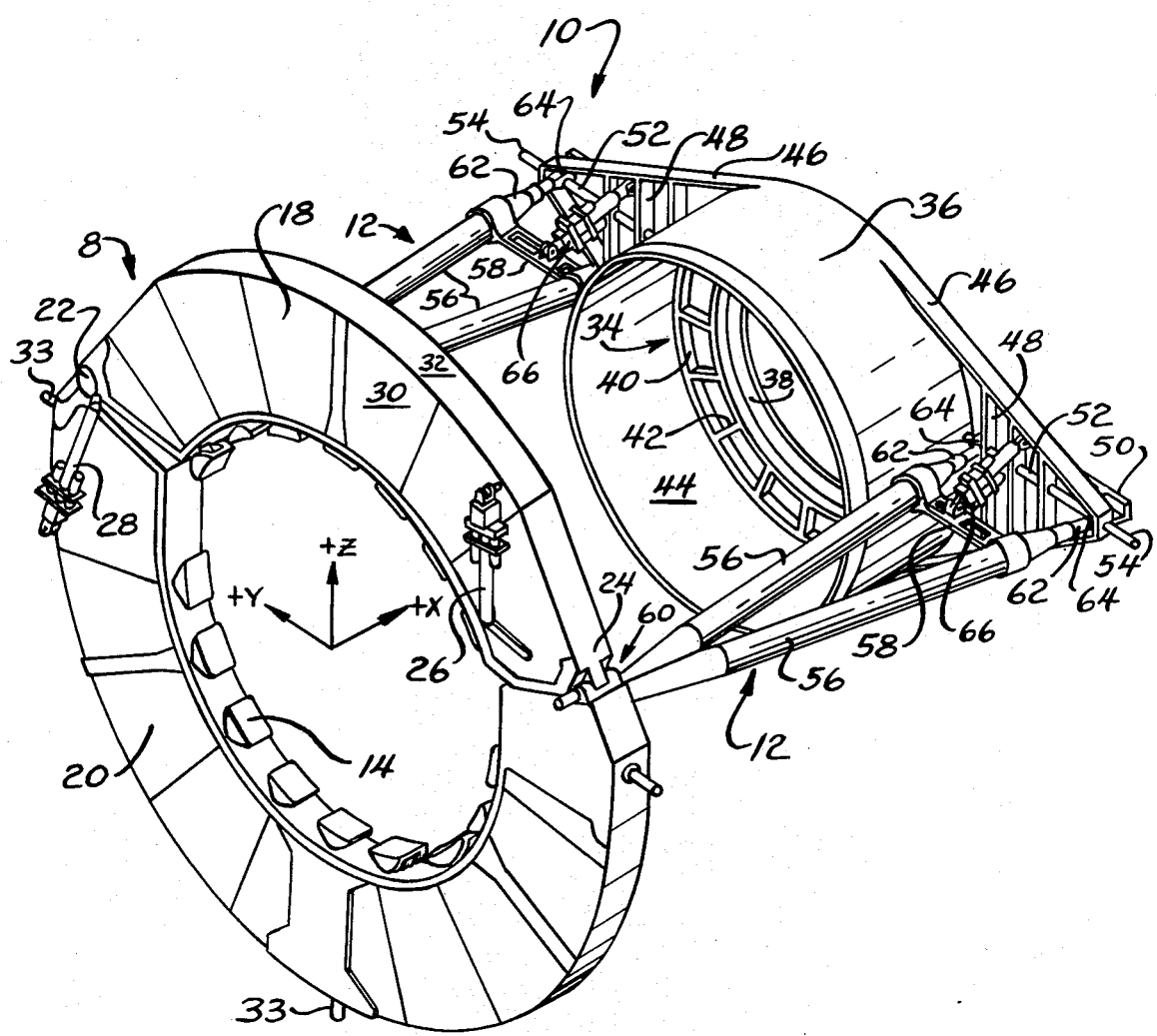
FIG. 2 is a perspective view of the forward cradle, the aft cradle and the longitudinal support members with the forward cradle in the closed position.

The components of the cradle assembly are illustrated in FIG. 2. The forward cradle 8 comprises two sections: an upper section 18 and a lower section 20. The two sections are connected by a hinge 22 and by a latch 24. A latch actuator 26 opens and closes the latch 24. When the latch 24 is open, the upper section 18 can be rotated away from the lower section 20 by means of a rotation actuator 28. FIG. 2 shows the upper section in the closed or latched position. Actuators 26 and 28 can be any suitable means for extending and contracting, such as hydraulic cylinders, for example.

The structure of the frame of the forward cradle 8 comprises a box beam 30 of conventional aluminum construction. The outer cap 32 of the box beam 30 comprises a lightweight material, such as a 0.25 inch thick graphite-epoxy composite piece, for weight reduction. The forward cradle is attached to the orbiter by standard longeron and keel fittings 33. The fittings around the hinge 22 are made of stainless steel or other suitable material.

As shown in FIG. 2, the aft cradle 10 comprises an aft cradle disc assembly 34 and an aft cradle adapter assembly 36. The aft cradle disc assembly 34 is mounted inside the aft end of the aft cradle adapter assembly 36. The aft cradle disc assembly 34 comprises a circular inner ring 38 formed from an angular shaped structural member and a circular outer ring 40. Inner ring 38 and outer ring 40 are connected by radial stiffeners 42.

The aft cradle adapter assembly 36 comprises an aft cradle adapter 44 and a webbed support system extending from either side of the adapter 44. The support system includes a pair of tangential supports 46 which are strengthened by vertical stiffeners 48 and horizontal beams 50. Horizontal bars 52 extend out from the aft cradle adapter 44 and run through holes in the vertical stiffeners 48. The outer ends 54 of the horizontal bars 52 serve as trunnions to be connected to the frame of the orbiter.

As shown in FIG. 2, the longitudinal support members 12 are mounted on each side of the forward cradle 8. Each longitudinal support member 12 comprises two longitudinal links 56. The forward ends of links 56 are joined together, while a horizontal spacer bar 58 is used to connect the aft ends of each of the links 56. The forward end 60 of each longitudinal support member 12 is pivotably connected to the lower section 20 of the forward cradle 8. The aft end 62 of each longitudinal support member 12 is pivotably connected to the horizontal bar 52 by means of spherical bearings 64. A tilt actuator 66 on either side of the aft cradle adapter assembly 36 is connected to the horizontal spacer bar 58 and the top inside surface of the tangential support 46. After the upper section 18 of the forward cradle 8 is rotated into the open position by operation of rotation actuator 28, the aft tilt actuators 66 are used to rotate the aft cradle 10 to the launch position.

While the preferred embodiment of the invention has been illustrated and described, it is to be understood that the invention is not limited to the precise construction therein disclosed and the right is reserved to all changes and modifications coming within the scope of the invention as defined in the appended claims.

We claim:

1. A support structure for carrying a payload in a cargo bay of a space vehicle comprising:
    a forward cradle having a generally annular configuration and an inner surface conforming generally to the outer surface of a payload, said forward cradle comprising a section fixedly mounted in said cargo bay and an openable section;
    an aft cradle having generally an annular configuration and an inner surface conforming generally to the outer surface of a payload and rotatable about its transverse axis; and
    at least one elongated longitudinal support member directly connecting the fixed section of said forward cradle and said aft cradle and providing a structural tie that transfers loads in the plane defined by the axis of said longitudinal support member and the longitudinal axis of said forward cradle and said aft cradle.

2. An apparatus as claimed in claim 1 wherein a plurality of means for supporting the payload are attached to the inside surface of said forward cradle.

3. An apparatus as claimed in claim 1 wherein said longitudinal support member comprises at least one pair of longitudinal links that are joined at the forward end and spaced apart at the aft end and which lie in a plane parallel to the plane defined by the axis of said longitudinal support member and the longitudinal axis of said forward cradle and said aft cradle.

4. An apparatus as claimed in claim 1 wherein the openable section of said forward cradle is joined to the fixed section of said forward cradle by a hinge and a latch.

5. An apparatus as claimed in claim 1 wherein said aft cradle comprises an aft cradle disc assembly and an aft cradle adapter assembly.

6. An apparatus as claimed in claim 1 wherein said forward cradle and said aft cradle are attached to the space vehicle by trunnion and keel fittings projecting outwardly from said forward cradle and said aft cradle.

7. An apparatus as claimed in claim 4 wherein first actuator means opens and closes the latch and second actuator means opens and closes the openable section of said forward cradle.

8. An apparatus as claimed in claim 1 wherein third actuator means rotates said aft cradle about an axis transverse to the axis of said forward and aft cradles.

9. An apparatus as claimed in claim 6 wherein loads in a plane perpendicular to the plane defined by the axis of said longitudinal support member and the longitudinal axis of said forward cradle and said aft cradle are transferred to the body of the space vehicle by said trunnion and keel fittings.

10. An apparatus as claimed in claim 3 wherein the fixed section of said forward cradle and said aft cradle are directly connected by a pair of said elongated longitudinal support members.

* * * * *